United States Patent [19]
Pittner

[11] 3,749,988
[45] July 31, 1973

[54] CONSTANT TENSION CONTROL SYSTEM FOR A DC REEL DRIVE MOTOR
[75] Inventor: John Richard Pittner, Pittsburgh, Pa.
[73] Assignee: Westinghouse Electric Corporation, Pittsburgh, Pa.
[22] Filed: Jan. 3, 1972
[21] Appl. No.: 214,808

[52] U.S. Cl. .................................. 318/6, 242/75.44
[51] Int. Cl. ........................................... B59h 59/38
[58] Field of Search ................... 318/6, 7; 242/75.44

[56] References Cited
UNITED STATES PATENTS

| 3,223,906 | 12/1965 | Dinger | 318/7 |
| 3,192,482 | 6/1965 | Long | 318/6 UX |
| 2,021,757 | 11/1935 | Umansky | 318/7 X |
| 2,366,148 | 12/1944 | Montgomery | 318/7 X |
| 3,348,107 | 10/1967 | Hamby | 318/6 |
| 3,280,393 | 10/1966 | Crossley | 318/6 |
| 3,018,978 | 1/1962 | Graneau et al. | 318/6 X |

Primary Examiner—T. E. Lynch
Attorney—F. H. Henson, J. J. Wood et al.

[57] ABSTRACT

A constant tension system for a direct current reel drive motor operating to wind or unwind a coil of strip material moving at a line speed. A coil diameter signal D is derived which is a function of the instantaneous coil diameter, the coil having a finite diameter Do when the reel drive motor is at the weakest motor field setting. A motor field controller coupled to receive the coil diameter signal regulates the field flux $\phi$ so that when $D>Do$, $\phi$ is a function of $D$, and when $D \leq Do$, $\phi$ is a constant. An armature current controller is coupled to receive the coil diameter signal $D$ and to control the armature current $Ia$ so that when $D>Do$, $Ia$ is constant, and when $D \leq Do$ to enable the operator to reduce line speed so that the reel drive motor will not exceed its highest rated voltage and speed.

5 Claims, 5 Drawing Figures

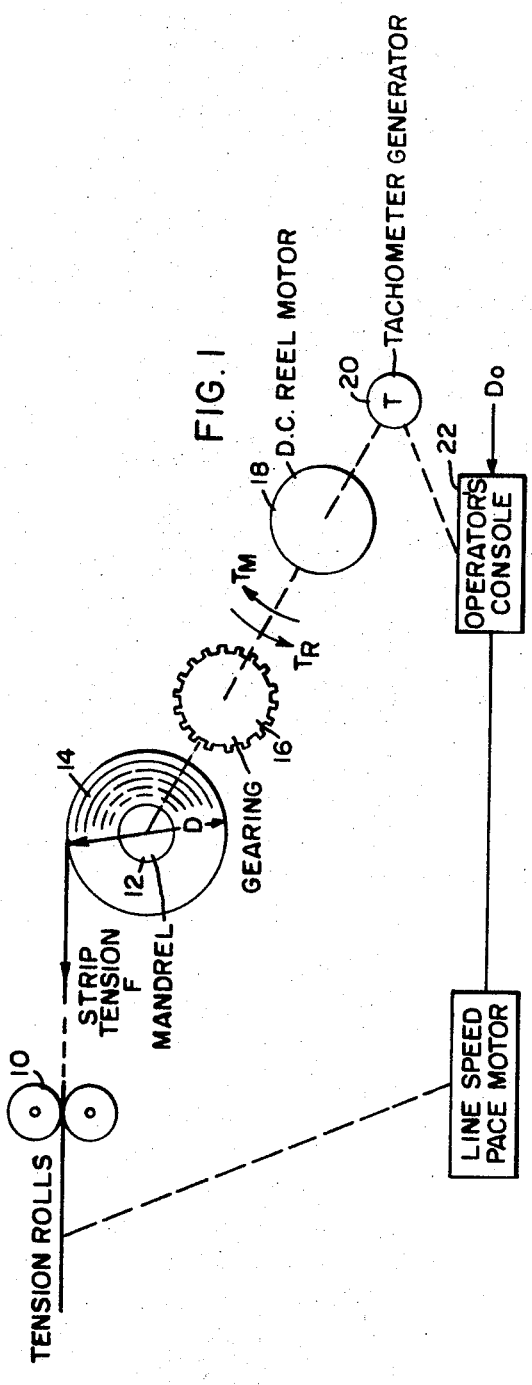
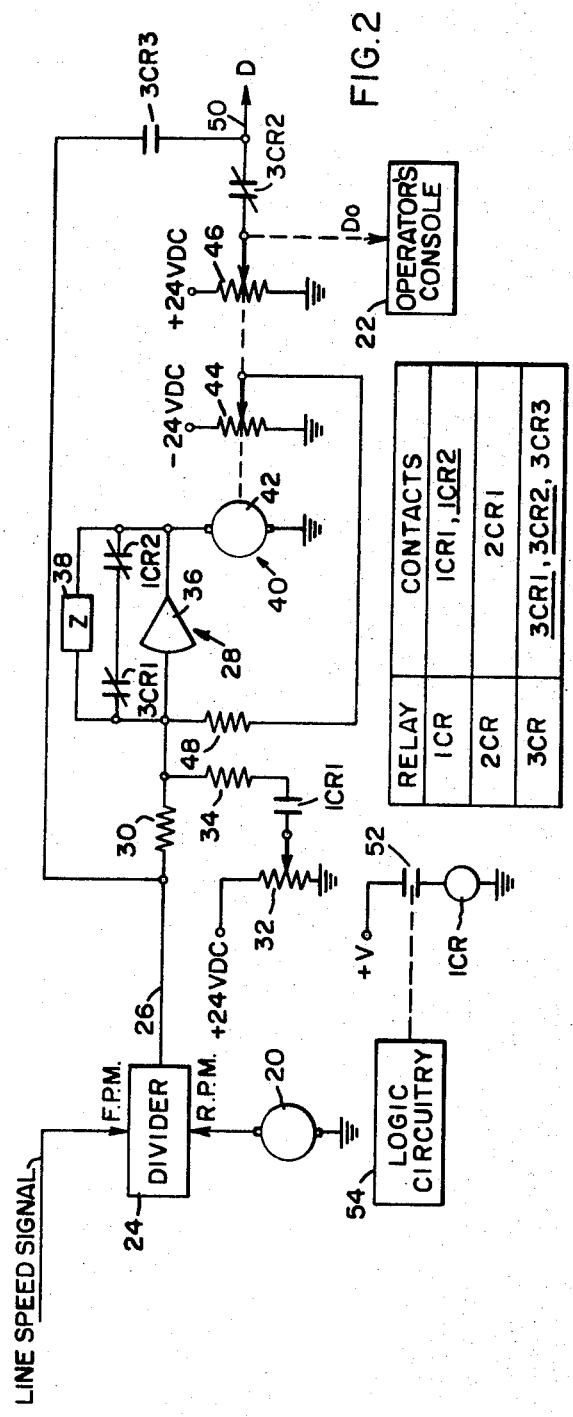

CONSTANT TENSION CONTROL SYSTEM FOR A DC REEL DRIVE MOTOR

BACKGROUND OF THE INVENTION

1. Field of the Invention

The invention relates to a constant tension control system for a direct current reel drive motor operating to wind or unwind a coil of strip material moving at a preset line speed.

2. Description of the Prior Art

The prior art has provided a variety of techniques for controlling a direct current reel drive motor so as to ensure constant tension in a coil of strip material that is being wound or unwound. For the most part these techniques have worked well, but the problem remains that they are costly. The present invention provides a system which may be applied to most process lines to enable an increase in the reel diameter range beyond the direct current motor speed range which is available by field weakening, while stil maintaining constant tension. The horsepower requirements for the reel drive motor do not have to be increased, if the line speed is lowered slightly below optimum at the smaller reel diameters. This reduction in line speed at the smaller coil diameters is modest and is tolerable for most process line applications.

SUMMARY OF THE INVENTION

A constant tension control system is provided for a direct current reel drive motor operating to wind or unwind a coil of strip material moving at a preset line speed. Means provide a signal which is a function of the instantaneous coil diameter $D$, the coil of strip material having a diameter $Do$ when the reall drive motor is at the weakest field flux setting. Means are coupled to the diameter signal means for receiving the diameter signal $D$ for controlling the field flux of said reel drive motor so that the flux is a function of the instantaneous coil diameter $D$ when $D > Do$ and the flux is constant when $D \leq Do$. Means are also coupled to the diameter signal means for receiving the diameter signal D and for controlling the armature current Ia of the reel drive motor so that $Ia$ is a constant when $D > Do$ and is a function of $D$ when $D \leq Do$. Means are also coupled to the diameter signal means to provide a signal to enable the line speed to be reduced when $D \leq Do$.

BRIEF DESCRIPTION OF THE DRAWINGS

FIG. 1 is a schematic illustrating one environmental setting for the constant tension control system of the instant invention;

FIG. 2 is an electrical schematic showing the diameter memory and diameter signal circuitry utilized in constant tension control system of the invention;

GENERAL CONSIDERATIONS

Figure 3:
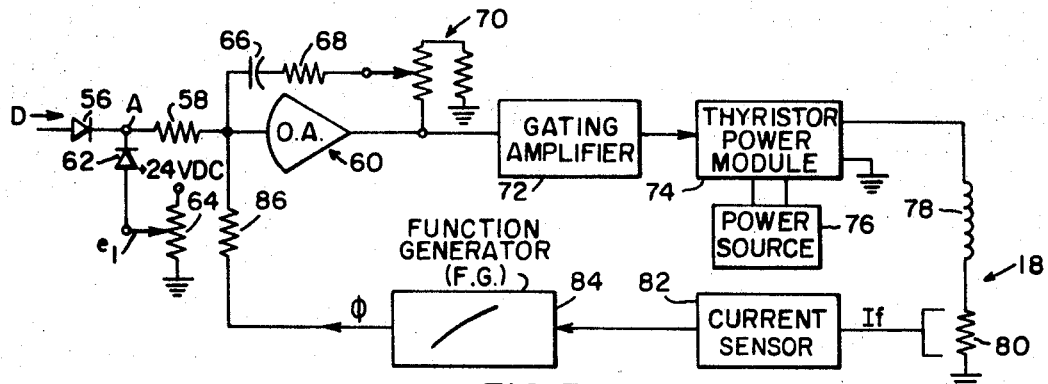
FIG. 3 is an electrical schematic showing the motor field flux control circuitry utilized in the constant tension control system of the invention.

Referring now to FIG. 1, a strip of material passing through tension rolls 10 as being wound on a mandrel 12 to form a coil 14. As noted in FIG. 1, the coil has a variable diameter D. The mandrel 12 is coupled, through gearing shown symbolically at 16, to a d.c. reel drive motor 18. A tachometer genrator 20 is connected to the shaft of motor 18. The output signal of the tachometer generator is utilized at several points throughout the system, but here in FIG. 1 it is shown being coupled to the operator's console 22 to enable the reel drive motor speed to be monitored. The operator's console 22 is connected to enable the speed of the line speed pacer motor (unnumbered) to be controlled. (The line speed pacer motor sets the speed for the entire process line. Reel drive motor 18 essentially acts as a drag machine during unwind, but as a motoring machine during wind-up) The torque of the reel and the torque of the motor are indicated at $T_R$ and $T_M$ respectively.

In order to understand the rationale upon which the invention rests, the following mathematical analysis will be presented.

$$F = T_R/r \tag{1}$$

where
 $F =$ strip tension (force)
 $Tr =$ reel torque
 $r =$ reel radius

But by definition $r = D/2$ $$\tag{2}$$

where $D =$ reel diameter
 Substituting for $r$ in (1)

$$F = 2\, T_R/D \tag{3}$$

$$T_R = FD/2 \tag{4}$$

Neglecting losses, under steady state conditions, the reel torque $T_R$ transmitted through the gearing is balanced by the motor torque $T_M$. Thus $$TM = K_1\, T_R \tag{5}$$

where
 $Tm = 0$ motor torque
 $K_1 =$ the gearing constant
 The torque of a d.c. motor is:

$$Tm = K_T\, \phi\, Ia \tag{6}$$

where
 $K_T =$ motor torque constant
 $\phi =$ the field flux
 $Ia =$ the armature current
 Substituting the relationship of equations (4) and (5) in equation (6).

$$K_1(FD/2) = K_T\, \phi\, Ia \tag{7}$$

Solving for strip tension $F$ $$F = (2 K_T/K1) \times (\phi Ia/D) \quad (8)$$

Speed control of a d.c. motor is usually accomplished by field weaking, the motor being at base speed at full field, and at the highest speed at the weakest field.

When the coil diameter is relatively large, shunt field current control is used to compensate for diameter change, and $$\phi = K_2 D \quad (9)$$

where $K_2$ is a constant of proportionality

Substituting the latter equation in equation (8), $$F = (2K_T K_2/K1) \times Ia \quad (10)$$

Thus the strip tension F depends only on the operator setting for the armature current reference $Ia$. In contemplation of this invention, constant tension will be obtained by flux control between full field and weak field.

At weak field no further weaking of the field is permissible. At the coil diameter $Do$ at weak field, the instant invention switches to control of the armature current as a function of the coil diameter, to maintain constant tension, the flux being held constant. The mathematical considerations are as follows:

$$Ia = K_3 D \text{ for } D \leq Do \quad (11)$$

where
$D$ = the instantaneous diameter
$Do$ = the coil diameter corresponding to the weakest motor field flux.
$K_3$ = a constant of proportionality which includes the operator's reference setting Substituting (11) in equation (8)

$$F = (2 K/K1) \times (\phi K_3 D/D) \quad (12)$$

At weak field flux, $\phi$ itself is kept constant, so that the tension F depends only on the setting of $K_3$. In this mode of operation, i.e., $Ia$ is varied as a function of D, the line speed may have to be adjusted. This is brought about by the fact that in a process line there is a motor (line place setter motor) drive which sets the speed of the line — this is in accordance with the line speed setting which the operator selects at the operator console 22. The current reguator reel motor 18 drags or sets up a counter force in the material which establishes the tension. When the weak field is reached, the reel motor is then running at the highest speed. At this point the $Ia$ is adjusted downward if in the pay-out mode or upward if in the wind-up mode. The reel drive motor operates at whatever voltage is necessary to maintain the line speed. Thus at weak field unless the reel motor 18 and its power supply can temporarily operate at an over-voltage condition, the line speed must be reduced slightly.

DESCRIPTION OF THE PREFERRED EMBODIMENT

Figure 5:
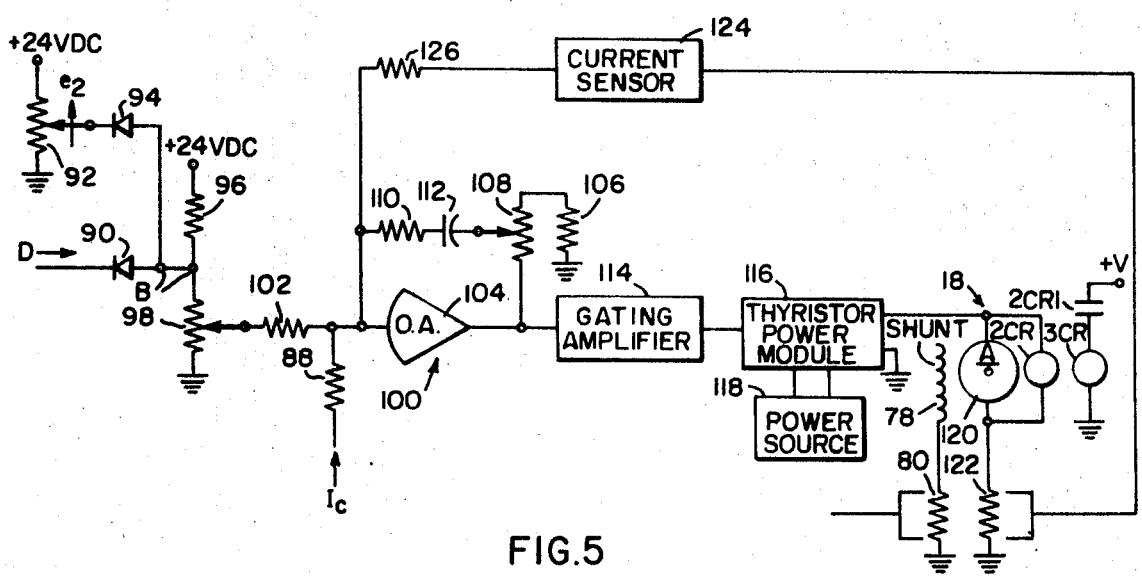
FIG. 5 is an electrical schematic showing the armature current control circuitry utilized in the constant tension control system of the invention.

The system of the invention maintains constant tension control in a moving strip of material in the payout as well as winding-up modes by means of (a) field weakening regulation (circuitry of FIG. 3) and (b) armature current regulation (circuitry of FIG. 5). As has been indicated under the caption General Considerations, the strip tension F is a function of the reel diameter D, and more specifically it varies inversely as the diameter D. In order then to maintain constant tension, one must know D at all times. Moreover, since there are occasions when the process line must be temporarily stopped, it is imperative that the diameter D at the moment of stopping be "remembered." The circuitry of FIG. 2 will accomplish these dual objectives.

Referring now to FIG. 2, the reel speed signal (R.P.M.) obtained from the tachometer generator 20 is applied as a divisor input to a divider 24. The line speed signal (which is a function of the line speed in feet per minute (FPM) is fed as a dividend input to the divider 24. The quotient output 26 from the divider 24 is applied to an operational amplifier, indicated generally at 28, through a resistor 30. Information concerning the start-up diameter of the coil 14 is applied to the operational amplifier 28 by means of a potentiometer 32 connected between a positive source of d.c. voltage (+24v) and ground, the wiper being serially connected through normally open contacts 1CR1, and resistor 34 to the amplifier input.

The relays described in this application are identified as follows. The coils are numbered 1CR, 2CR and 3CR. The contact pairs associated with the respective coils are identified for example as 3CR1, 3CR2, 3CR3, the 3 preceeding the CR identifying the third contact relay, the numeral following CR identifying the particular contact pair viz first (1), second (2), third (3); the bar beneath the identifying numeration indicates that the contact is normally closed, while no bar signifies that the contacts are normally open.

The operational amplifier 28 includes a high gain amplifier 36 having a feedback path contianing contacts 3CR1 and 1CR2, in parallel with an impedance 38. The output of the amplifier 36 is connected to a motor operated potentiometer indicated generally at 40, having potentiometers 44, 46, the wiper contacts of which are arranged to the rotationally displaced in unison in accordance with the rotation of the motor 42. The wiper of potentiometer 44 is connected to the input of the amplifier 36 through resistor 48. The wiper of potentiometer 46 is connected through the contacts 3CR2 to the output 50. The wiper of potentiometer 46 may be used to provide a signal for the operator to monitor when $Do$ is reached or a separate potentiometer may be mounted on the common shaft of the motor operated potentiometer 40. Completing the description of the diameter memory and signal circuitry, the relay 1CR is energized through contacts 52 which are momentarily closed on signal from the logic circuitry 54.

The diameter signal D of FIG. 2 is applied simultaneously to the circuitry of both FIGS. 3 and 5. First considering FIG. 3, the diameter signal is applied to diode 56 poled as shown, through resistor 58 to an operational amplifier indicated generally at 60. A diode 62 has its cathode connected to node A, while its anode is connected to the wiper contact of a potentiometer 64, connected between a positive source of d.c. (+24v) and ground.

The operational amplifier 60 is a proportional-integral controller comprising a high gain amplifier having a feedback path which includes serially connected capacitor 66 and resistor 68. The gain of the amplifier is adjustable by means of the series connected potentiometer-resistor combination indicated generally at 70. The output signal from the operational amplifier 60 is applied to a gating amplifier 72, the output of which is connected to a thyristor power module 74. The power module 74 is coupled to a power source 76 which may be single phase or three phase a.c. depending upon power requirements for the system. The output of the T.P.M. 74 is applied to the shunt field 78 of the reel motor 18. The shunt field 78 is arranged in series with a current sensing resistor 80. A current sensor signal $I_f$ derived from resistor 80 is applied to a current sensor 82 which develops a voltage which is a function of the field current. The output of the current sensor 82 is applied to a function generator 84 which develops a signal which is a function of flux $\phi$, which signal is then applied to the motor flux controller 60 through a resistor 86.

The diameter signal D is also fed to the FIG. 5 circuit through a diode 90 having its anode connected to a node identified at B. A potentiometer 92 is connected between a positive source of d.c. (+24v) and ground, the wiper of which is connected to the cathode of a diode 94, whose anode is connected to node B. A resistor 96 is connected at one end to a source of d.c. potential (+24v) the other end being connected to node B. An operator's tension potentiometer 98 is connected between node B and ground. The wiper of potentiometer 98 is connected to an operational amplifier indicated generally at 100, through a resistor 102. An inertial compensation signal Ic is applied to the proportional integral controller 100 through a resistor 88. The operational amplifier 100, arranged to operate as a proportional integral controller, comprises an amplifier 104 having an output resitor-potentiometer 106,108 connected between the output and ground. The wiper of potentiometer 108 is connected in a feedback path which includes serially connected resistor 110 and capacitor 112.

The output of the proportional integral controller 100 is applied to a gating amplifier 114 which is coupled to a thyristor power module (T.P.M.)indicated symbolically at 116. The thyristor power module 116 is connected to a power source 118 which may be single phase or three phase a.c. The output of the thyristor power module 116 is applied to the armature 120 of the reel drive motor 18. In series with the armature 120 is a current sensing resistor 122. The armature current through resistor 122 is applied to current sensor 124 which developes a voltage signal which is fed back to the operational amplifier 100 through resistor 126. A relay 2CR is connected in shunt with the armature 120. The relay 3CR is connected to a relay power source +V through normally open contacts 2CR1.

OPERATION OF THE CONSTANT TENSION CONTROL SYSTEM

The operation of the system in the payout as well as wind up mode is very similar. Assume that the operational environment is in a steel mill where a reel is to be payed out. The operator makes the tension adjustment by adjusting the potentiometer 98 (FIG. 5). The diameter size of the reel 14 (FIG. 1) to be payed out is known to the operator and this information requires a certain definite setting for the potentiometer 32 (FIG. 2). In the steel mill, the reel 14 (FIG. 1) is first mounted on a mandrel 16 which is segmented and adapted to collapse so as to fit inside various inner reel diameters. When the mandrel 12 is released it presses outward forcing itself tightly against the inner diameter of the reel. By means of sensors (not shown) the logic circuitry 54 (FIG. 2) then sends a signal momentarily closing contacts 52 thereby connecting power to relay 1CR. Upon the energization of relay 1CR: (a) contacts pair 1CR1 (FIG. 2) closes and the voltage corresponding to the operator setting for potentiometer 32 is applied as an input to operational amplifier 28, and (b) contact pair 1CR2 opens removing the short in the amplifier to enable the actuation of the motor 42. The come-to-rest setting of the potentiometers 44,46 represents an analog voltage representative of the initial diameter of the reel 14.

At low speeds of the reel motor 18, the quotient output 26 of the divider 24 is unreliable, (accordingly the divider is not utilized until the reel motor 18 reaches sufficient speed to make the quotient output 26 reliable). In the meanwhile the output signal $D$ is that of the initial diameter. As the reel motor 18 increases in speed, a point is reached where the quotient output 26 of the divider 24 is reliable; this point may be identified in that the armature 120 (FIG. 5) develops a voltage of a sufficient magnitude to energize relay 2CR. The sole contact of 2CR viz 2CR1 closes applying power to relay 3CR. The energization of relay 3CR performs three functions: (a) <u>3CR1</u> opens removing the short on the operational amplifier 28, and the quotient signal 26 is applied to the operational amplifier 28 to cause the motor operated potentiometer 40 to be actuated; (b) contacts <u>3CR2</u> open isolating the motor operated potentiometer 40 from the circuits of FIGS. 3 and 5; and (c) contact pair 3CR3 closes so that the quotient signal 26 is fed directly to the output. Thus the setting of the wiper 46 serves to "remember" the diameter D should the process line be stopped for any reason. Also it should be observed that the quotient signal 26 is fed directly to the circuitry of FIGS. 3 and 5 through now closed contacts 3CR3.

A brief consideration of the nature of the quotient signal 26 is in order, $$\frac{FPM}{RPM} = \frac{\frac{ft.}{min.}}{\frac{revolutions}{min.}} = \frac{number\ of\ feet}{1\ revolution}$$

One revolution = the instantaneous circumference of the reel. Since the circumference = $\pi$ × diameter of reel, the number of feet divided by $\pi$ equals the diameter of the coil. As the reel is payed out the diameter is constantly being reduced while conversely during the wind up of mode the diameter is continuously increasing.

Motors are designed to operate between full field and weakest field to provide a range from base speed to the highest speed. Depending upon the manufacturer's specification, operation beyond weakest field may be permitted for certain voltages ranges and for limited periods of time.

The motor field controller (FIG. 3) operates such that above the reel diameter Do corresponding to the weakest field flux:

$$\phi = f(D)$$

Below the reel diameter $Do$ at weakest field:

$$\phi = \text{constant}$$

The potentiometer 64 is adjusted to a voltage $e_1$ equal to the voltage signal $Do$ when the reel diameter is at weakest field. The input signal to the proportional integral controller 60 is the voltage at node A divided by the ohmic magnitude of resistor 58. At large reel diameters the voltage signal $D$ is greater than $e_1$ and the flux $\phi$ is directly proportional to the diameter $D$. As the reel diameter decreases, the input signal decreases proportionally. When the reel diameter reaches $Do$ and then decreases below the weakest field diameter $Do$, the voltage $e_1$ determines the input signal to proportional integral controller 60. This input signal is the voltage $e_1$ divided by the ohmic magnitude of resistor 58. Thus the input signal is a constant at and below the weakest field.

Figure 4:
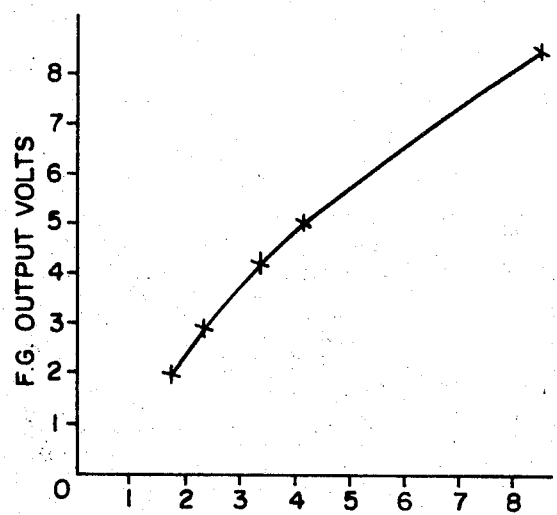
FIG. 4 is a diagram depicting output voltage vs input voltage for the function generator used in the circuitry of FIG. 3.

Because of motor field flux saturation, the motor field flux is not directly proportional to motor field current. A function generator is required to convert the motor field feedback signal to a voltage proportional to the motor field flux. The function generator 84 modifies the motor field feedback signal from the current sensor 82, producing the output voltage vs input voltage curve shown in FIG. 4. The output voltage is then proportional to the motor field flux. The function generator 84 shapes the feedback signal to compensate for iron saturation of the motor field. The shape of the curve depends on the design characteristics of the motor. The curve of FIG. 4 is derived from the motor field flux saturation curve which is peculiar to the particular motor being utilized.

The output of the proportional integral controller 60 is applied to the gating amplifier 72 the function of which is to provide gating pulses to fire the thyristors of the thyristor power module 74 which converts the a.c. line voltage to a controlled d.c. output voltage. The diameter signal D generated from the circuitry of FIG. 2 is also applied to the armature current controller of FIG. 5.

Briefly, to review, the requirements for armature current (for constant tension at a given line speed) are: (a) above weakest field reel diameter $Do$, the current is constant, and (b) at and below weakest field reel diameter $Do$, the armature current is proportional to the diameter $D$.

When the diameter signal $D$ is greater than weakest field diameter $Do$, The voltage at node B is equal to $e_2$ (neglecting the drop across the diode), and the armature current is constant depending upon the operator's setting for potentiometer 98. As the reel diameter decreases, the voltage $D$ becomes less than voltage $e_2$ and node B matches the voltage signal $D$. The input signal to the proportional integral controller 100 therefrom decreases and armature current decreases. Thus the armature current reference decreases proportionally with the reel coil diameter.

The armature current controller 100 also receives an inertial compensation signal Ic which may be derived by standard techniques to compensate for dynamically changing inertial conditions. The generation of this signal forms no part of this invention and hence its derivation will not be described.

With the weakest field setting, the motor is at its maximum speed. Briefly, the line pace setter motor sets the process line speed. The reel motor is essentially a drag machine during pay-off, and a motoring machine during rewind. At weak field, the motor 18 will run at higher speeds and voltage to accommodate the line speed and this could possible cause electrical and mechanical damage to the motor. Depending upon the manufacturer's rating, some overload voltage may be tolerated brief periods. However, as indicated earlier a primary objective of this invention is to enable a lower h.p. motor to be utilized, so most likely the smaller motor will have limited overvoltage range. Thus it is likely that the line speed will have to be reduced. The operator can determine when the line speed should be reduced and by how much. At the operator's console 22 (FIG. 1) the signal $Do$ tells him the line speed should be reduced. The speed of the line speed pace motor is then reduced while the operator monitors the reel motor speed by means of the signal from the tachometer generator 20. At smaller reel diameters the reduction in line speed is relatively 0small so that this is an acceptable solution for most process line applications.

Completing the details for the circuitry of FIG. 5, the potentiometer 92 is set to a voltage $e_2$ which is equal to the voltage signal Do when weakest field is reached. Resistor 96 and the potentiometer 98 are selected so that the voltage at node B (with the leads to the cathodes of diodes 90,94 open) is greater than voltage $e_2$. Resistor 102 is selected so that with the voltage at node B equal to voltage $e_2$, by turning the potentiometer full clockwise 100 percent rated armature current will obtain. The potentiometer 92 and diode 94 are included as part of the circuitry to facilitate set up and field adjustments.

I claim:

1. A constant tension control system for a direct current reel drive motor operating to wind or unwind a coil of strip material moving at a preset line speed comprising:
   a. means for providing a signal which is a function of the instantaneous coil diameter $D$, the coil having a finite diameter $Do$ when the reel motor is at the weakest field flux;
   b. means coupled to receive said diameter signal D and to deliver a field control output signal which is coupled to the field of said reel motor, so that the field flux $\phi$ is a function of the instantaneous diameter $D$ when $D > Do$, and the field flux $\phi$ is constant when $D \leq Do$;
   c. means coupled to receive said diameter signal $D$ and to deliver an armature current output control signal which is coupled to the armature of the reel motor so that when $D > Do$ the armature current Ia is constant, and Ia is a function of $D$ when $D \leq Do$; and
   d. means coupled to receive said diameter signal $Do$ to provide an output signal to enable the preset line speed to be reduced when $D \leq Do$.

2. A constant tension control system according to claim 1 wherein
   a. ' said diameter signal means comprises divider means having dividend and divisor inputs, and a quotient output, said inputs being connected to receive a line speed signal and a reel motor rotational speed signal respectively, the quotient output being a function of the instantaneous diameter $D$.

3. A constant tension control system according to claim 1 wherein b. ' said motor field control means comprises mixer means and an operational amplifier operated as a proportional integrator, said mixer means having dual inputs and an output, said inputs receiving said diameter signal $D$ and a constant magnitude signal which is a function of $Do$, said mixer means output being a function of $D$ when $D > Do$ and being equal to said constant magnitude signal for all magnitudes of $D \leq Do$, said operational amplifier having an input for receiving said mixer output, and an output for delivering said field control output signal.

4. A constant tension control system according to claim 1 wherein c. ' said motor armature current control means comprises mixer means and an operational amplifier operated as a proportional integrator, said mixer means having dual inputs and an output, said outputs receiving said diameter signal $D$, and a constant magnitude signal which is a function of $Do$, said mixer means output being equal to said constant signal when $D > Do$, and being a function of $D$ for all magnitudes of $D \leq Do$, said operational amplifier having an input for receiving said mixer output and an output for delivering said armature current control output signal.

5. A constant tension control system according to claim 2 comprising e. means for memorizing the instantaneous diameter $D$, comprising an operational amplifier, a motor-operated potentiometer comprises a motor and a plurality of potentiometers, the potentiometers have respective wiper contacts which are ganged together and coupled to the motor shaft so as to be displaced in unison, the operational amplifier being operated as an integrator, and having an input and an output, the input being connected to receive said quotient output, the output being connected to energize said potentiometer motor, one of said wipers being connected in a feedback path to said operational amplifier input, the instantaneous positions of said wipers, being a voltage magnitude which is a direct function of the instantaneous diameter $D$.

* * * * *